Sept. 6, 1960 H. A. PEARSON 2,951,915

PLAYBACK SYSTEM FOR STEREOPHONIC RECORDS WITH MECHANICAL RUMBLE FILTER

Filed June 9, 1958 2 Sheets-Sheet 1

INVENTOR.
H. A. PEARSON

BY Greene, Pineles & Durr
ATTORNEYS

INVENTOR.
H. A. PEARSON
BY Greene, Pineles & Durr
ATTORNEYS

United States Patent Office 2,951,915
Patented Sept. 6, 1960

2,951,915

PLAYBACK SYSTEM FOR STEREOPHONIC RECORDS WITH MECHANICAL RUMBLE FILTER

Harry A. Pearson, White Plains, N.Y., assignor to Sonotone Corporation, Elmsford, N.Y., a corporation of New York Filed June 9, 1958, Ser. No. 740,622

7 Claims. (Cl. 179—100.41)

This invention relates to the reproduction of phonograph records, and particularly to the reproduction of stereophonic phonograph records, wherein different transverse face portions or segments of the same record groove represent complementary stereophonic record sequences which, when played back with a stereophonic phonograph pickup having a single groove-engaging stylus, will provide faithful reproduction of such stereophonic records. More particularly, the invention is concerned with reproduction of stereophonic disc records of the type generally used, and known as the "45–45" record system, such as described, for instance, in Keller et al. Patent 2,114,471.

Whereas the high-fidelity reproduction of laterally-cut record grooves of disc records of the type widely used in the past did not represent any difficulties due to vertical turntable vibrations or vertical rumble, the reproduction of stereophonic records is disturbed by vertical rumble vibrations in the very low frequency range below about 500 c.p.s. (cycles per second). In the past, it has been proposed that in the reproduction of stereophonic records, such disturbing low-frequency rumble vibrations be suppressed by a rumble-suppressing electric network connected in the reproducing amplifier circuit of stereophonic phonographs. However, it should be noted that vertical rumble vibrations may also have a disturbing effect on the reproduction of laterally-cut record grooves.

The present invention is based on the discovery that in the reproduction of stereophonic records, the disturbing rumble vibrations may be suppressed by embodying in the mounting connection between the pickup and the phonograph tone arm carrying the pickup, a spring element which forms with the vibratory mass of the pickup and the mass of the tone arm, a filter system which cuts off or suppresses the undesirable turntable rumble vibrations, without materially affecting the high-quality reproduction of the stereophonic records.

The foregoing and other objects of the invention will be best understood from the following description of an exemplification of the invention, reference being had to the accompanying drawings, wherein:

Fig. 1 is a side elevational view of a portion of a tone arm carrying a stereophonic pickup along grooves of a record disc, and forming a rumble-suppressing filter system exemplifying the invention;

Figure 4:
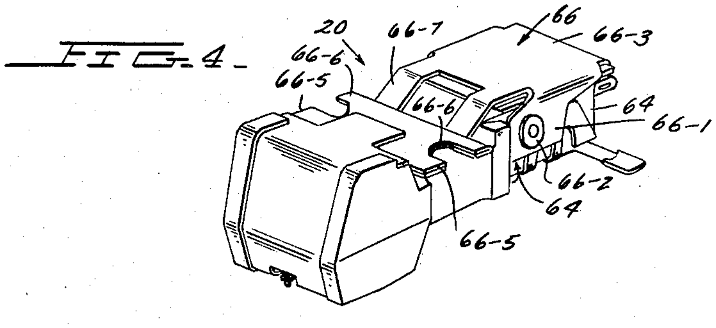
Fig. 4 is an enlarged perspective view of the pickup of Figs. 1–3, as seen from the top side thereof, together with its bracket spring connection to the tone arm.

In most of the widely used phonograph turntables, the phonograph motors cause undesirable vibrations or rumble of the turntable or tone arm in the very low frequency range of below 300 to 500 c.p.s. (cycles per second). Such low-frequency vibrations are most predominant in vertical direction, i.e., in the direction perpendicular to the normally horizontal record disc which is being rotated on the turntable. Such vertical rumble vibrations do not affect the high-quality reproduction of the record discs used in the past on which the records were represented by lateral groove undulations in a plane perpendicular to the vertical direction of the disturbing rumble vibrations. This is due to the fact that all pickups used for playing back the lateral record undulations of conventional record discs have tranducers that are sensitive only to lateral groove undulations in a horizontal direction, and their transducers are substantially insensitive to and do not reproduce the rumble or any other vertical vibrations.

In the stereophonic record system as adopted by the industry, known as the 45–45 record system, such as described in Keller et al. Patent 2,114,471, the signals from two laterally displaced microphones are represented by different undulations in the right and left faces of a record groove, known as the right and left record channels, respectively, of a record groove in a stereophonic record disc rotating in clockwise direction around a central axis. The left and right record channel undulations of such a record groove are perpendicular to each other and at 45° to the plane of the record surface. In accordance with the adopted standards, two equal and in-phase signals are represented in the two record channels of a record groove, by lateral groove undulations corresponding to the vectorial resultant of the two equal and in-phase signals. Likewise, in accordance with adopted standards, two equal but opposite phase signals are represented in the two record channels of a record groove, by vertical groove undulations corresponding to the vectorial resultant of the two equal and opposite-phase signals.

Suppression of the vertical signal components of the left and right record channels of the record grooves, would result in reproduction of the lateral components only. This would destroy the stereophonic illusion effect and cause the sound to be reproduced as though it were picked up by a single microphone played over a single channel.

It is well known that even when listening with two ears, it is difficult for a person to locate the source of pure tones below 200 to 300 c.p.s. It is also known that musical instruments which produce low frequencies below 300 c.p.s., produce these frequencies with a range of higher overtones. This fact makes it possible to locate the low-frequency instruments by the audible sensations or clues derived from the higher-frequency overtones of their low-frequency sounds. These conditions underlie the use of electric filters in playback circuits of stereophonic discs for electrically suppressing or cutting off the vertical component of low frequencies below about 300 to 500 c.p.s., and thereby suppressing the disturbing vertical rumble vibrations which are within this low-frequency range. The suppression of the vertical component of these low-frequencies below 300 to 500 c.ps., still leaves in the reproduced sound spectrum of such stereophonic record grooves, the vertical components of the overtones of these low-frequency sounds which make it possible to locate their special origin. For creation of the stereophonic illusion, it is thus sufficient that the vertical record components of a 45–45 stereophonic record groove or the like, should be reproduced only over the frequency range from about 300 to 500 c.p.s. and higher.

It is among the objects of the present invention to eliminate the need of special electric filters for cutting out or suppressing low rumble frequencies when reproducing stereophonic records played back on a phonograph turntable. In accordance with the invention, the mass of a stereophonic pickup and the mass of the tone arm which carries the pickup along the record grooves, are combined into a mechanical filter which suppresses the vertical component at very low frequencies in the range of the turntable rumble vibrations, thereby eliminating the need for electric cut-off filters in the playback circuits of such phonographs.

Although the invention is also applicable to recording and reproducing records wherein lateral and vertical groove undulations of a single record groove represent two stereophonically related record sequences, the invention has been evolved and will be described herein, in connection with the stereophonic disc record systems adopted by the industry, in which the stereophonically related signals are represented by two mutually perpendicular record faces or channels of a record groove inclined 45° to the record surface. Furthermore, the principles of the invention are also applicable to playing back any other type of related sound sequences recorded on two transverse surface portions or segments of a single record groove.

Although the principles of the invention are applicable to pickups operating with any of the available mechano-electric signal transducers, such as electromagnetic, magneto-dynamic and the like, and with any available types of groove-tracing stylus arrangements, they will be described herein in connection with a stereophonic pickup operating with a set of two ceramic transducer elements which are driven by a common single stylus arranged to engage and be driven by the two segmental undulation sequences of a single record groove. Although the two transducer elements may form distinct sections of a single, integral transducer structure, the invention will be described herein in connection with a stereophonic pickup operating with two separate transducer elements.

Figure 6:
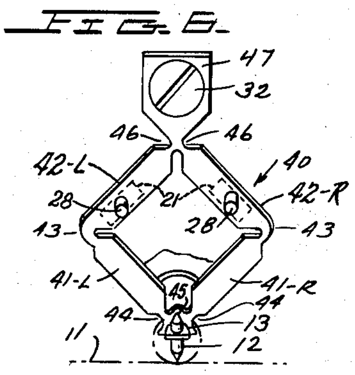
Fig. 6 is an exposed front end view of the transducer arrangement of the pickup shown in Fig. 5.
Figure 5:
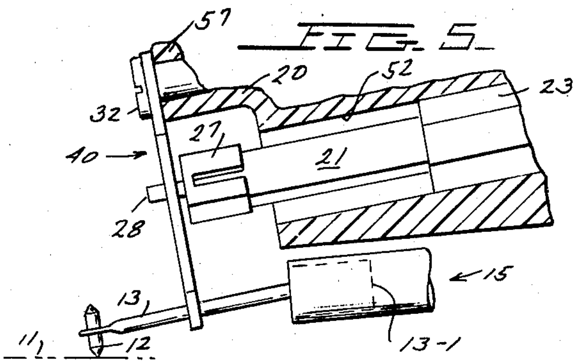
Fig. 5 is a side view of the transducer arrangement of the pickup of Figs. 1–4, with the pickup housing broken away to expose its interior.

The principles of the invention will now be described in connection with a specific exemplification thereof shown in Figs. 1–6. On the forward part of a tone arm 67 of a conventional disc-type phonograph is shown mounted a stereophonic pickup or pickup housing 20 carrying all operating elements of the pickup. In the pickup housing or mounting structure 20 are mounted two transducers 21 which are actuated by the motion of a pickup stylus 12 riding in a stereophonic record groove of a conventional stereophonic 45–45 disc record member 11, for playing back complementary stereophonic signal sequences represented by the right and left faces or channels of each record groove convolution of such record. The pickup housing 20 is relatively rigid, and has two transducer compartments 52 in which are operatively mounted two mechano-electric transducers such as two piezoelectric transducers 21 having a movable front part 28 and a restrained rear part which is surrounded by an elastomer bias body 23 and held restained thereby within the confining walls of the transducer mounting compartment 52. The two transducers 21 are arranged to be driven by either one of two differently directed styli 12 secured at the front end of a thin, light stylus rod 13 operatively carried by a coaxial relatively thick mounting or seating member 14. The seating member 14 has a thinner cylindrical seating portion (not shown) which is rotatively held and guided by a guide structure 70 secured to the rear housing part 64 of pickup housing 20, so as to permit rotation of the stylus rod 13 by its lateral grip 14–2 for bringing either one of the two styli 12 into record groove-engaging position. The minute motion imparted to the stylus by the two record channel faces of a record groove is transmitted to the two transducers 21, respectively, by a motion-resolving quadrangle link chain 40 (Figs. 5 and 6).

The motion-resolving quadrangle link chain 40 has at two diagonally opposite corners lying in a generally vertical plane, a stylus coupling element 45, and an anchor element 47 secured as by a screw or rivet 32 to a mounting wall 57 of the pickup housing 20. The stylus motion-resolving quadrangle link chain 40 has two stylus drive arms or links 41–L, 41–R which are pivotally connected through the flexible pivot junctions 44 to the stylus coupling element 45 of the quadrangle link chain 40. The two stylus drive links 41–L, 41–R are mutually perpendicular and under 45° to the plane of the record surface 11, and they are guided in their proper motion-resolving operation in the direction of their length under 45° to the record surface 11 by their pivotal connections to two guide arms or links 42–L, 42–R of the quadrangle link chain 40. To provide the desired motion-resolving action, the two guide links 42–L, 42–R are mutually perpendicular and under 45° to the record surface, and they are pivotally connected through flexible pivots 46 to a neck of the anchor portion 47 by means of which the motion-resolving quadrangle link chain 40 is affixed in its operative position to the rigid pickup housing 20.

The movable coupling ends 28 of the two transducers are shown as coupling pins which are drivingly coupled and seated in a coupling and seating opening of either the two drive links 41–L, 41–R, or, as shown, the two guide links 42–L, 42–R, respectively. The features of the invention involving a stereophonic pickup or record cutter in which the elements of two transducers and a single stylus are combined with a stylus motion-resolving quadrangle link chain of the type shown, constitutes the subject-matter of the co-pending application of N. H. Dieter, Jr., Serial No. 740,760, filed June 9, 1958, assigned to the assignee of the present application.

In accordance with the more limited aspects of the invention, the disturbing effects of the vertical turntable rumble vibrations at very low frequencies in the range below about 300 to 500 c.p.s. on the signal output of a stereophonic pickup, are suppressed by combining the principal mass of a stereophonic pickup structure and the mass of the tone arm carrying the pickup structure with a spring mounting connection between them which forms with these masses a mechanical filter system which cuts off or suppresses signals of the rumble frequency range without affecting the lateral response, and thereby not materially disturbing the stereophonic illusion or effect of the played back complementary stereophonic record channels. The spring connection of this filter system may be provided between the main mass of the pickup mounting structure carrying its operating element and a relatively light housing or housing section thereof which is rigidly affixed in a conventional way, as by screws, to a mounting portion of the tone arm. In accordance with a phase of the invention, the mounting bracket by which the entire mass of the pickup including its entire housing is affixed to the tone arm, is utilized to provide the spring connection which forms with their masses the filter system which secures such suppression of the disturbing rumble vibrations.

Figure 7:
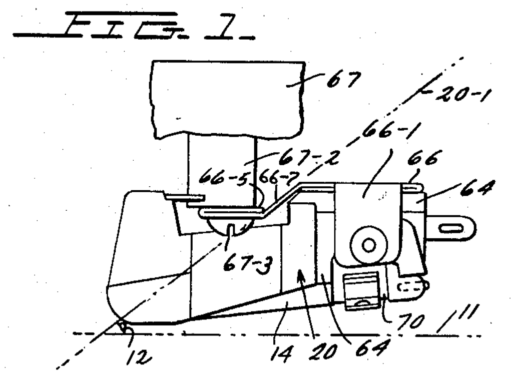
Fig. 7 is a side view similar to Fig. 1, showing greatly enlarged the spring bracket connection between the pickup and the tone arm of Figs. 1–4.
Figure 3:
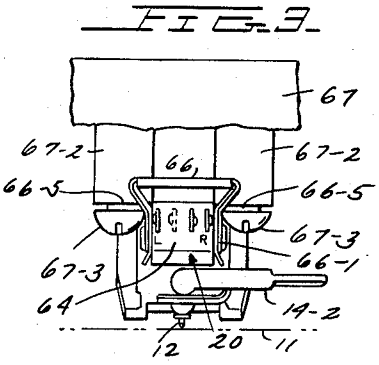
Fig. 3 is a rear end view of the pickup of Fig. 1, together with the tone arm on which the pickup is mounted.
Figure 2:
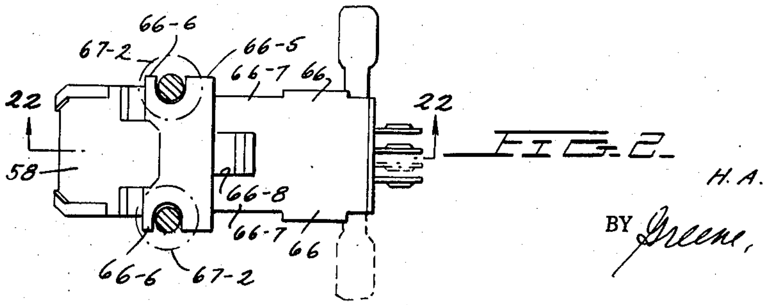
Fig. 2 is a top view of the pickup of Fig. 1, with the tone arm removed to expose the spring bracket connection of the pickup to the tone arm.
Figure 9:
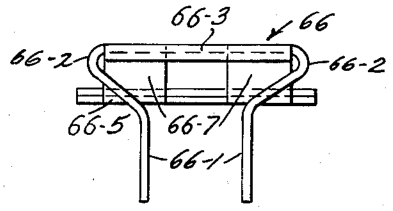
Figs. 8 and 9 are top and rear end views, respectively, of the spring bracket connection of Fig. 7.
Figure 8:
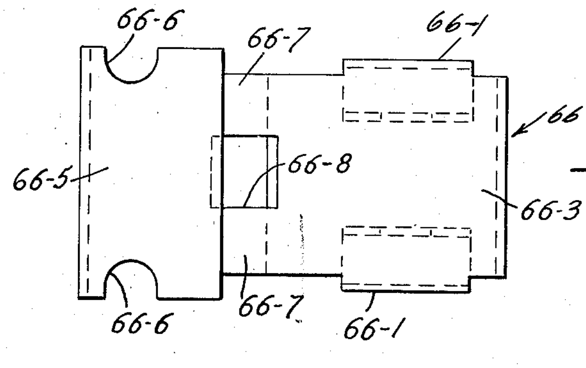

As an example, one form of mounting connection between a tone arm and a stereophonic pickup with which they are combined in accordance with the invention into such mechanical rumble-frequency-suppressing filter, will now be described. Referring to Figs. 1–4, showing the pickup and tone arm, and Figs. 7–9, showing details of their bracket connection, the pickup mounting structure 20 is shown connected to two downwardly projecting mounting bosses 67–2 of the tone arm 67 by a bracket generally designated 66. The bracket has at one end a relatively rigid mounting section 66–3 by which it is secured to the rear housing part 64 of pickup housing 20, and at the other end, a relatively rigid opposite mounting section 66–5 by which it is secured to the downward faces of the downwardly projecting mounting bosses 67–2 of tone arm 67. The pickup bracket mounting section 66–3—which overlies and is held pressed against the underlying terminal assembly in the pickup rear housing part 64—has two integral mounting arms 66–1 which are affixed and clamped as by a rivet 66–2 to the pickup rear housing part 64. The tone-arm bracket mounting section 66–5 is affixed and clamped to the overlying tone arm bosses 67–2 by two screws 67–3 extending through and engaging mounting recesses or holes 66–6 of bracket mounting section 66–5.

The tone arm 67 has one end (not shown) mounted, as by a pivot support of a conventional disc-type turntable phonograph.

The two rigid mounting portions or sections 66–3 and 66–5 of mounting bracket 66 are joined to each other by an intermediate elastically compliant spring junction section 66–7 shown formed by two intermediate spring arms of the bracket structure 66.

Figure 10:
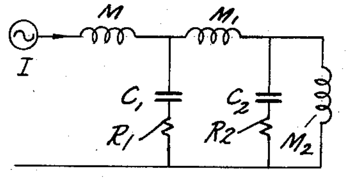
Fig. 10 is an electric circuit analog the constants of which represent the electro-mechanical elements of a rumble-suppressing filter of the pickup and tone arm combination exemplifying the invention.
Figure 7:
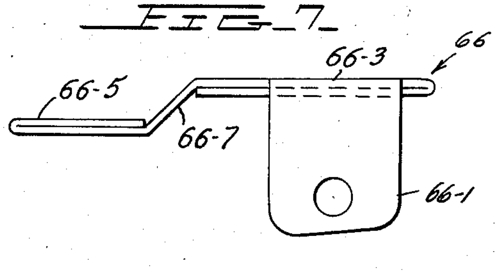

The mass of a pickup mounting structure 20 connected by a bracket spring arm connection 66 of the type described, to the mass of the tone arm 67, will operate as a low-frequency cut-off filter which may be represented by the electric circuit analog of Fig. 10. In the electric analog of Fig. 10, the different circuit elements represent the following elements of the pickup-tone arm combination:

I is an alternating constant current source corresponding to the constant velocity vibratory forces acting on the pickup stylus.

M is an inductance corresponding to the effective mass of the pickup stylus which is subjected to the vibratory forces.

$C_1$ is a capacity corresponding to the elastic compliance of the transducer system of the pickup.

$M_1$ is an inductance corresponding to the total effective mass of the pickup.

$C_2$ is a capacity corresponding to the compliance of the bracket spring connection 66–7 between the pickup and the tone arm.

$M_2$ is an inductance corresponding to the effective mass of the tone arm.

$R_1$, $R_2$ are the mechanical damping resistances associated with the elements $C_1$ and $C_2$, respectively.

It can be shown that a mechanical filter of the type represented by the analog of Fig. 10, starts cutting off or suppressing the vibrations or response for decreasing frequency at a frequency which is near the resonant frequency of a system consisting of the capacity $C_2$ (corresponding to the bracket spring connection 66–7) having the inductances $M_1$ and $M_2$ (corresponding to the effective masses of the pickup and tone arm) connected in parallel thereto. In other words, for lowering frequencies, the mechanical filter of the type represented by the analog of Fig. 10 starts cutting off the disturbing low turntable rumble vibrations at a frequency which is near the resonant frequency of a system consisting of the bracket spring 66–7 which is loaded at one end with the effective mass of the pickup 20, and loaded at the other end with the effective mass of the tone arm 67. It is thus a simple matter to design the bracket spring connection 66–7 between the pickup 20 and the tone arm 67 so as to cause the system to operate as a filter which cuts off the turntable rumble vibrations. In practice, good results are obtained by designing the system consisting of the bracket spring 66–7 having its ends loaded with the masses of the tone arm and the pickup so that the resonant frequency of such system and its low-frequency cut-off, is slightly higher than the most disturbing component frequency of the turntable rumble vibrations, which is between about 110 and 300 c.p.s. In other words, suppression of the low frequencies corresponding to the turntable rumble, will start near the resonant frequency of the system consisting of the bracket spring 66–7 loaded at one end with the effective mass of the pickup and at the other end loaded with the effective mass of the tone arm, with the resonant frequency of such system chosen to be between 110 and 300 c.p.s.

In practice, the compliance of the spring junction bracket connection 66–7 between the mass of the pickup 20 and the mass of the tone arm 67, is chosen so that resonance of the system occurs in the range of the principal rumble vibrations which are to be suppressed. As an example, taking into consideration the fact that in most commercial high-quality record changers the mass of the tone arm resonates with the compliance of the pickup at about 20 to 30 c.p.s., and that the compliance of the transducer system of a stereophonic cartridge of the type described, is in the range of about $2\times10^{-6}$ cm./dyne, good results are obtained by designing the bracket spring connection 66–7 between the masses of the pickup 20 and tone arm 67, so that they form a system which resonates at about 150 c.p.s.

Figure 11:
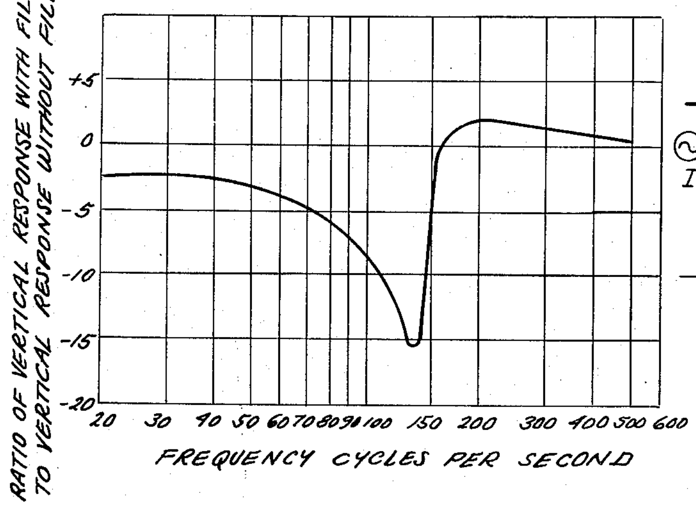
Fig. 11 is a curve diagram representative of the operation of one example of a rumble-suppressing filter combination of a stereophonic record-reproducing system exemplifying the invention.

Fig. 11 is a curve diagram in which the ordinates show for different frequencies along the horizontal axis, the ratio of the vertical response of a stereophonic pickup operating with a filter system of the invention, to the vertical response of a similar pickup having a rigid connection to the tone arm. As seen in Fig. 11, with such low-cut filter system, the suppression of the low frequency output of the pickup starts near the resonance frequency of the system consisting of the bracket junction spring 66 loaded at one end with the effective mass of the pickup and at the other end with the effective mass of the tone arm.

The pick-up tone arm vibrating system represented by the analog of Fig. 10, will also resonate at the still lower resonant frequency of the system consisting of the sum of the effective masses $M_1$ and $M_2$ of the pickup and the tone arm, together with the compliance $C_1$ of the transducer system. In practical phonograph devices, this lower resonant frequency is usually lower than 30 c.p.s. Vibrations at these low frequencies do not disturb the playback output of such phonograph systems, because most practical speaker systems or sound reproducers have only little or no response for frequencies at 30 c.p.s. and lower. Such low frequencies are also suppressed by damping elements which are usually embodied in the pickup transducer system, such as the elastomer bodies 23 within which the transducer elements 21 are held mounted in the pickup mounting structure 20, as explained above. Damping of frequencies down from 30 c.p.s. may be obtained by attaching to the tone arm, small suspended body portions of vanes of elastomer damping material, with the damping vanes loaded by a correspondingly small load mass affixed to the free end of such damping vanes, or by providing damping such as frictional damping or elastomer sleeve damping at the pivot support of the tone arm.

Although tests indicate that vertical turntable rumble has substantial rumble components at about 30 c.p.s. the suppression of these rumble components in the pickup output is of no practical significance, because, as explained above, in connection with the lower resonant frequency of the mass system $M_1+M_2$ with the transducer compliance $C_1$, most practical speaker systems have only little or no response at 30 c.p.s. and lower.

The spring section 66–7 of the bracket connection 66 between the pickup 20 and the tone arm 67 may have undesirable vibratory resonant motion or modes. Such vibratory resonant motion of the bracket spring section 66–7 of the system is suppressed by forming the spring bracket section of a spring material which has high internal vibration-damping friction, or by embedding the spring bracket section 66–7 in or securing to one or both of its extended surfaces, layers of damping material having high internal friction. Metals or metal alloys having high internal friction are those having a high logarithmic decrement of at least $10\times10^{-3}$. Logarithmic decrement is defined as the logarithm of the ratio of the vibration amplitudes of two successive cycles of a body of a given material when allowed to vibrate freely (American Institute of Physics Handbook, 1957, pages 2–84 to 2–87). As an example, tungsten, which has a logarithmic decrement of $16.5\times10^{-3}$, will by itself provide a spring junction section 66–7 with sufficient internal damping to suppress resonant modes thereof.

Alternatively, a spring junction section 66–7 of spring metal having a high logarithmic decrement, has applied thereto, as by cement, a layer of or is embedded between coating layers of resinous damping material, such as acrylic resins, polyvinyl resins, polymethane resins, silicone resins, epoxy resins, polyethylene resins, polystyrene resins, cellulose acetate resins, and the like. Alternatively, good results in damping resonant vibrations are obtained by using for the spring bracket connection between the pickup and the tone arm a metal such as steel, Phosphor bronze, beryllium-copper, or like spring metal which has a low logarithmic decrement, and uniting thereto, as by coating or plating, a layer of metal having high logarithmic decrement. Suitable coating or plating metals of high logarithmic decrement are soft metals and metal alloys such as tin, lead, zinc, or the like, and alloys of such soft metals. In the commercial stereophonic pickups of the invention, the bracket spring 66, as shown, is formed of beryllium-copper spring sheet stock .016" in thickness, and after cleaning the surface of the finally shaped bracket spring, it is dipped in a molten bath of a commercial grade of solder, such as consisting of 5 parts tin and 2 parts lead. After removing the bracket spring 66 from the molten tin-lead bath, the excess metal is thrown off, leaving on cooling a soft-metal coating layer of 0.001" to 0.002" thickness, which was found sufficient for providing the required damping of undesired resonant vibratory modes of such bracket spring.

In accordance with a phase of the invention disclosed herein, the bracket 66 with its rigid mounting sections 66–3 and 66–5 and its intermediate flexible spring junction section 66–7 constitute an integral structure formed, as by cutting out of a sheet blank of a single thickness of spring sheet metal and thereafter folding portions of the sheet blank to provide the rigid bracket sections 66–3 and 66–5 out of doubled-up, folded sheet thicknesses of the blank, and leaving between them a single thickness of the flexible, compliant spring junction arms 66–7. The folded sheet portions which form the mounting sections 66–3 and 66–5 of the bracket are united to each other as by cement or by the molten coating metal applied thereto, as when the bracket 66 is dipped, as in a molten tin-lead bath for providing its spring section 66–7 with the desired vibration damping properties.

A longitudinal slot 66–8 cut along the intermediate part of the width of the spring metal region 66–7 of bracket structure 66 to provide two laterally-spaced spring arms 66–7, makes it possible to provide the combined junction spring structure 66 with desired great stiffness and resistance to torsional deformation while giving the two spring arms 66–7 thereof limited width and sufficiently low and proper compliance for forming with the masses of the pickup structure and the tone arm the vertical rumble-suppressing filter system.

As shown in Fig. 1 by the inclined dash-double-dot line 20–1, the surfaces of the spring junction sheet arms 66–7 between the pickup 20 and the tone arm 67, lie in a common plane which passes through the groove-engaging stylus. This plane alignment of the bracket spring arm junction 66–7 between the pickup 20 and the tone arm 67 with the groove-engaging stylus 12, is designed to assure that forces acting on the stylus will not subject the spring arm junction 66–7 to any appreciable torque that would tend to turn the pickup assembly around the axis of this spring arm junction, or tend to excite torsional modes of the pickup assembly. In addition, as pointed out above, the spacing of the two spring arm junctions 66–7 is sufficiently large to give the combined spring junction such high torsional stiffness as to prevent torsion turning thereof by torque forces applied to the stylus 12. With such arrangement, forces exerted on the stylus and transmitted thereby to the spring junction arms 66–7 of the tone arm-pickup bracket connection 66, are not able to turn or torsionally displace the pickup 20 with its transducers 21 from their proper operative alignment relatively to the record groove. The spring junction arms 66–7 which lie in a plane passing through the groove-engaging stylus 12 of the pickup 20, are spaced apart a sufficient distance to assure that the stiffness of the spring junction arms in the direction normal to their axes and lying in the plane passing through the stylus, is several thousand times greater than the stiffness of the spring arms 66–7 in a direction transverse to their surfaces. As an example, good results are obtained with a bracket spring junction 66–7 between the pickup 20 and tone arm 67, which extends in a plane of the groove-engaging stylus of the pickup 20 and has in the direction normal to their axes and lying in their plane, a stiffness of ten-thousand times greater than the stiffness in the spring junction in a direction or plane perpendicular or transverse to the surfaces of the spring arms 66–7.

The present application claims the broad features of the invention disclosed herein, involving the combination of a pickup carried by a tone arm through a spring connection between them, which spring connection forms with the masses of the pickup structure and the tone arm body a filter for cutting off the pickup response to low-frequency rumble vibrations. Other features of the invention disclosed herein, directed to structural features of the spring connection support between the pickup and tone arm are the subject-matter of and are claimed in co-pending application of N. H. Dieter, Jr., Ser. No. 740,621, filed June 9, 1958, and assigned to the assignee of the present application.

It will be apparent to those skilled in the art that the novel principles of the invention disclosed herein in connection with specific exemplifications thereof, will suggest various other modifications and applications of the same. It is accordingly desired that in construing the breadth of the appended claims, they shall not be limited to the specific exemplifications of the invention described above.

I claim:

1. In a pickup structure adapted to be carried by a movable pickup support body of a phonograph for playing back undulations of a record groove formed in a generally horizontal surface and containing two different record undulation sequences extending along different transverse segments of the groove, said pickup structure comprising a stylus arranged to engage the record groove and to be driven by both of its undulation sequences in two different transverse planes each inclined to said record surface, a transducer system including at least two mechano-electric transducer elements having movable transducer portions, respectively, and a coupling structure connecting said movable transducer portions to said stylus and supporting said stylus for vibration simultaneously in said two different planes in accordance with corresponding different motion components of said stylus for causing each of said transducer elements to be responsive to horizontal and vertical motion components of said stylus and generating corresponding electric output in said transducer elements, respectively, spring junction elements connecting said pickup structure to said support body and constituting the sole support by which said support body carries said pickup structure in operative position along the record groove, the effective masses of said pickup structure and of the support body constituting together with the compliance of said junction spring elements connected between them a vibrating system having a resonant frequency of at most 500 cycles per second, and also constituting a mechanical vibration filter system operative to suppress response of each of said transducer elements to vertical low-frequency vibrations corresponding to turntable motor rumble.

2. In a pickup adapted to be carried by a pickup support body of a phonograph, as claimed in claim 1, the effective mass of the pickup structure and the effective mass of the support body constituting together with said spring junction connected between them a vibrating system having a resonant frequency between 100 and 300 cycles per second.

3. In a pickup adapted to be carried by a pickup support body of a phonograph, as claimed in claim 1, said spring junction portion having one relatively rigid mounting section secured to said pickup, and a further relatively rigid mounting section secured to said support body and connected solely through said spring junction elements to said one mounting section.

4. In a pickup adapted to be carried by a pickup support body of a phonograph, as claimed in claim 3, the effective mass of the pickup and the effective mass of the support body constituting together with said spring junction section connected between them a vibrating system having a resonant frequency between 100 and 300 cycles per second.

5. In a pickup adapted to be carried by a pickup support body of a phonograph, as claimed in claim 1, said spring junction elements being formed of metal having a logarithmic decrement lower than $10 \times 10^{-3}$ and having secured thereto a layer of material having a logarithmic decrement greater than $10 \times 10^{-3}$ for damping resonant vibratory modes thereof.

6. In a pickup adapted to be carried by a pickup support body of a phonograph, as claimed in claim 5, said spring junction elements being formed of metal having a logarithmic decrement lower than $10 \times 10^{-3}$ and having secured thereto a layer of metal having a logarithmic decrement greater than $10 \times 10^{-3}$ for damping resonant vibratory modes thereof.

7. In a pickup adapted to be carried by a pickup support body of a phonograph, as claimed in claim 5, said spring junction elements being formed of metal having a logarithmic decrement lower than $10 \times 10^{-3}$ and having secured to both sides thereof a layer of metal having a logarithmic decrement greater than $10 \times 10^{-3}$ for damping resonant vibratory modes thereof.

References Cited in the file of this patent

UNITED STATES PATENTS

| | | |
|---|---|---|
| 2,032,194 | Wiebusch | Feb. 25, 1936 |
| 2,485,137 | Brown et al. | Oct. 18, 1949 |
| 2,510,342 | Kilgour | June 6, 1950 |
| 2,848,559 | Palo | Aug. 19, 1958 |